United States Patent
Smith et al.

(10) Patent No.: US 9,422,060 B2
(45) Date of Patent: Aug. 23, 2016

(54) TURBOPROP-POWERED AIRCRAFT WITH THERMAL SYSTEM

(75) Inventors: Stephen John Richard Smith, Leyland (GB); Kieran James Watt, Fulwood (GB)

(73) Assignee: BAE SYSTEMS PLC, London (GB)

( * ) Notice: Subject to any disclaimer, the term of this patent is extended or adjusted under 35 U.S.C. 154(b) by 513 days.

(21) Appl. No.: 13/979,065

(22) PCT Filed: Jan. 6, 2012

(86) PCT No.: PCT/GB2012/050013
§ 371 (c)(1),
(2), (4) Date: Jul. 10, 2013

(87) PCT Pub. No.: WO2012/095645
PCT Pub. Date: Jul. 19, 2012

(65) Prior Publication Data
US 2013/0292085 A1    Nov. 7, 2013

(30) Foreign Application Priority Data

Jan. 11, 2011 (EP) .................................... 11275005
Jan. 11, 2011 (GB) .................................. 1100401.7

(51) Int. Cl.
*B64D 13/00* (2006.01)
*B64D 13/06* (2006.01)
(Continued)

(52) U.S. Cl.
CPC ............... *B64D 13/00* (2013.01); *B64D 13/06* (2013.01); *B64D 13/08* (2013.01); *B64F 1/362* (2013.01); *B64D 2013/0614* (2013.01); *B64D 2013/0633* (2013.01); *Y02T 50/56* (2013.01)

(58) Field of Classification Search
CPC ........ B64D 13/06; B64D 13/08; B64D 13/00; B64D 2013/0614; B64D 2013/1633; B64F 1/362; Y02T 50/56
See application file for complete search history.

(56) References Cited

U.S. PATENT DOCUMENTS 2,408,867 A    10/1946  McCollum
2,563,054 A     8/1951  Messinger et al.
(Continued)

FOREIGN PATENT DOCUMENTS

CA         2175154 A1        1/2009
DE    102004023347 A1       12/2005
(Continued)

OTHER PUBLICATIONS

European Search Report for EP11275006 dated May 24, 2011.
(Continued)

*Primary Examiner* — Carlos A Rivera
(74) *Attorney, Agent, or Firm* — Maine Cernota & Rardin (57) ABSTRACT

A method and apparatus are disclosed for a turboprop-powered medium altitude long endurance (MALE) aircraft, having: a heat exchanger with a heat-storage material, for example a heat-storage wax; and an air recirculation path. The heat exchanger can be arranged to cool air recirculating around the air recirculation path which is arranged to provide cooling to the MALE aircraft, for example to an equipment bay. The heat-storage material may be cooled by ground-based cooling apparatus when the aircraft is on the ground and/or by ram air when the aircraft is in flight. The heat-storage material may have a melting point selected so as to be rendered solid during ground-based cooling and/or ram air cooling, and/or selected so as to undergo melting while cooling the air recirculating around the air recirculation path.

20 Claims, 7 Drawing Sheets

(51) Int. Cl.
    *B64D 13/08*    (2006.01)
    *B64F 1/36*    (2006.01)

(56) References Cited

U.S. PATENT DOCUMENTS

| | | | |
|---|---|---|---|
| 3,077,079 | A | 2/1963 | Pietsch |
| 5,484,122 | A | 1/1996 | DeSalve |
| 6,056,237 | A | 5/2000 | Woodland |
| 6,575,402 | B1 * | 6/2003 | Scott ............... B64C 27/20 244/12.2 |
| 7,305,842 | B1 * | 12/2007 | Schiff ............... B64D 13/06 62/244 |
| 8,459,966 | B2 * | 6/2013 | Hipsky ............... B64D 13/00 417/325 |
| 2003/0046944 | A1 | 3/2003 | Kitamura et al. |
| 2004/0141539 | A1 | 7/2004 | Delgado |
| 2004/0245385 | A1 * | 12/2004 | McElroy ............... B64C 39/024 244/58 |
| 2005/0034477 | A1 | 2/2005 | Hu |
| 2005/0050877 | A1 | 3/2005 | Venkataramani et al. |
| 2006/0219842 | A1 * | 10/2006 | Shell ............... B64D 13/06 244/118.5 |
| 2008/0053100 | A1 | 3/2008 | Venkataramani et al. |
| 2008/0092875 | A1 | 4/2008 | Leifer et al. |
| 2009/0095004 | A1 | 4/2009 | Kelnhofer et al. |
| 2009/0120099 | A1 | 5/2009 | Brand et al. |
| 2009/0199535 | A1 | 8/2009 | Brand et al. |
| 2009/0260781 | A1 | 10/2009 | Ullman et al. |
| 2009/0294573 | A1 | 12/2009 | Wilson et al. |
| 2010/0074736 | A1 | 3/2010 | Junod |
| 2010/0157525 | A1 | 6/2010 | Ullman et al. |
| 2012/0000220 | A1 | 1/2012 | Altay |
| 2012/0085867 | A1 | 4/2012 | Bardwell |
| 2012/0099616 | A1 | 4/2012 | Penny et al. |
| 2013/0283816 | A1 * | 10/2013 | Smith ............... B64C 39/024 60/784 |
| 2013/0292085 | A1 | 11/2013 | Smith |

FOREIGN PATENT DOCUMENTS

| | | |
|---|---|---|
| EP | 0 174 728 A1 | 3/1986 |
| EP | 0203501 A1 | 12/1986 |
| EP | 0389407 A1 | 9/1990 |
| EP | 1 895 123 A2 | 3/2008 |
| EP | 2 131 112 A1 | 12/2009 |
| GB | 675588 A | 8/1949 |
| GB | 2 470 043 A | 11/2010 |
| JP | 2006145168 A | 6/2006 |
| JP | 2009007900 A | 1/2009 |
| WO | WO 95/013467 A | 5/1995 |
| WO | WO 2005/073539 A1 | 8/2005 |
| WO | WO 2008/085536 A2 | 7/2008 |
| WO | WO 2010/049147 A1 | 5/2010 |
| WO | WO 2010/070273 A1 | 6/2010 |

OTHER PUBLICATIONS

GB Search Report for GB1100402.5 dated May 10, 2011.
Notification Concerning Transmittal of International Preliminary Report on Patentability (Forms PCT/IB/326 and PCT/IB/373) and the Written Opinion of International Searching Authority (Form PCT/ISA/237) issued on Jul. 25, 2013, by the International Bureau of WIPO in International Application No. PCT/GB2012/050013. (7 pages).
International Search Report (PCT/ISA/210) issued on Mar. 6, 2012, by the European Patent Office as the International Searching Authority for International Application No. PCT/GB2012/050014.
European Search Report for 11275004.7 dated Jun. 301, 2011.
United Kingdom Search Report for GB 1100399.3 dated Apr. 21, 2011.
International Search Report (PCT/ISA/210) issued on May 21, 2012, by the United Kingdom Patent Office as the International Searching Authority for International Application No. PCT/GB2012/050013.
European Search Report issued on Jun. 30, 2011.
United Kingdom Search Report issued on May 6, 2011.

* cited by examiner

TURBOPROP-POWERED AIRCRAFT WITH THERMAL SYSTEM

FIELD OF THE INVENTION

The present invention relates to thermal management of a turboprop aircraft, in particular a turboprop-powered Medium Altitude Long Endurance (MALE) aircraft.

BACKGROUND

For aircraft in general, many types of thermal management arrangements are known.

On the one hand, many types of aircraft and/or aircraft mission profiles are relatively simple, for example light aircraft with piston-powered propellers flying at low speeds at low altitude, and the thermal management arrangements may accordingly be relatively undemanding, e.g. use of simple ram air may suffice.

On the other hand, many other types of aircraft and/or aircraft mission profiles have highly demanding thermal management requirements, but factors such as the cost and complexity of those aircraft, and/or the high availability of fuel driven power during flight, make providing correspondingly complex and expensive (in terms of money or power consumption) thermal management arrangements practicable. For example, in jet-powered aircraft it is practicable to provide significant electrical power for heating and it is also practicable to use bleed power from the jet engines to provide heating or (when cooling is required) power to drive a conventional air conditioning system.

One specific type of aircraft with an associated mission profile is a turboprop-powered Medium Altitude Long Endurance (MALE) aircraft. Typically, a turboprop-powered MALE aircraft may carry out flights of long duration, e.g. more than 12 hours or even more than 24 hours or even more than 36 hours, and for example may fly at relatively high altitudes of between 30,000 and 50,000 feet (i.e. high compared to other known light aircraft) where there are lower temperatures, and may be a relatively cheap or simple aircraft. Also, a turboprop-powered MALE aircraft may be required to operate in areas of high temperature at ground level (e.g. up to 55° C.) and at low altitudes during take-off and approach.

SUMMARY OF THE INVENTION

The present inventors have realised that known aircraft thermal management arrangements are not ideally suited for a turboprop-powered MALE aircraft, in view of the above described characteristics of a turboprop-powered MALE aircraft and its mission profile, when considered individually and/or in combination. In particular, the present inventors have realised that the thermal management requirements for a turboprop-powered MALE aircraft fall in a middle-ground that is not suitably addressed by either of the extremes (undemanding or high demanding) of known thermal management arrangements mentioned earlier above. Consequently the present inventors have realised that the following may be beneficial either individually or in combination.

The present inventors have also realised that in view of the long endurance requirement for a turboprop-powered MALE aircraft it would be desirable to provide a means for capturing heat (to e.g. use to heat the payload when flying at altitudes that are cold) that reduces or removes completely any need to extract heat from the power being provided for propulsion (which would otherwise be the case conventionally with e.g. taking bleed air from the gas turbine engine or with e.g. extracting shaft power). Thereby the power would be preserved for contributing to extended flight endurance.

The present inventors have also realised it would be desirable to provide a cooling arrangement that does not need to use active air conditioning.

The present inventors have also realised it would be desirable to provide an intermediate cooling process for an intermediate part of the mission profile. In more detail, the present inventors have realised that in hot locations, the mission profile may be considered, for cooling purposes, as comprising various stages, for example a first stage where the aircraft is stationary on the ground where a conventional ground cooling trolley can be connected to the aircraft and carry out cooling of e.g. the aircraft payload, a second stage starting from when where the aircraft is disconnected from the cooling trolley and ending when the aircraft has climbed to a height where the ambient air is sufficient to be used to perform the required cooling, and a third stage when the aircraft is flying at or above the height required for the ambient air to be sufficient to be used to perform the required cooling. Note during the second stage the aircraft may be required to be stationary, perform taxiing to a take-off position, perform take-off and then climb to the later-mentioned altitude. Using this terminology, the present inventors have realised that cooling during the first and third stages can be performed relatively simply, whereas cooling during the second stage is more challenging. Accordingly, the present inventors have realised it would be desirable to provide an intermediate or "stop-gap" cooling process for the second stage that does not unduly complicate the simple cooling processes that may be used for the first and third stages. The present inventors have further realised that, due to the intermediate or "stop-gap" nature of such a cooling process for the second stage, it would be desirable to provide a solution for the second stage that is particularly efficient during its limited time of deployment, and where that particular efficiency was derived at least in part by making use of the very fact that it is only required to carry out its cooling role for a short limited duration of the second stage, and that moreover could preferably be easily "reset" during e.g. the first stage of the turboprop-powered MALE aircraft's next flight and/or during the third stage of a flight. The present inventors have further realised that such a solution could be provided by employing materials of e.g. high specific heat capacity/latent heat selected to have desired phase changing point temperatures, e.g. melting point. The present inventors have further realised it would be desirable to provide novel heat exchanger apparatus or arrangements to provide particularly efficient ways of using the materials mentioned in the preceding sentence, and that are particularly suitable for use on a turboprop-powered MALE aircraft.

The present inventors have further realised it would be desirable to provide a thermal management arrangement for a turboprop-powered MALE aircraft that is able to provide various of the above solutions in a turboprop-powered MALE aircraft such that they can be selected individually or in combination according to particular operating conditions a turboprop-powered MALE aircraft undergoes on the same or different flights.

In a first aspect, the present invention provides a turboprop-powered medium altitude long endurance aircraft, comprising: a heat exchanger comprising a heat-storage material; and an air recirculation path; wherein the heat exchanger is arranged to cool air recirculating around the air recirculation path; and the air recirculation path is arranged to allow the recirculating air to provide cooling to the MALE aircraft.

The heat exchanger may be arranged to allow the heat-storage material to be cooled by ground-based cooling apparatus when the aircraft is on the ground.

The heat exchanger may be arranged to allow the heat-storage material to be cooled by ram air when the aircraft is in flight.

The heat-storage material may have a melting point selected so as to be rendered solid during the cooling by the ground-based cooling apparatus and/or during the cooling by the ram air.

The heat-storage material may have a melting point selected so as to undergo melting to assist its heat capturing characteristics whilst cooling the air recirculating around the air recirculation path.

The air recirculation path being arranged to allow the recirculating air to provide cooling to the MALE aircraft may comprise the air recirculation path being arranged to allow the recirculating air to provide cooling to an equipment bay of the MALE aircraft.

The heat exchanger may comprise: an air flow channel; and a heat sink; wherein the heat sink is thermally coupled to the air flow channel and arranged such that in operation heat is extracted from air flowing along the air flow channel and the extracted heat is stored in the heat sink; and the heat sink comprises heat-storage material with a melting point selected relative to the temperature of air intended to be cooled such that the material is initially solid and then melts or starts to melt whilst extracting and storing heat from the air flowing along the air flow channel.

The heat-storage material may be a heat-storage wax.

The heat-storage wax may be paraffin wax.

The aircraft may be a surveillance aircraft and/or it may be an unmanned aerial vehicle.

In a further aspect, the present invention provides a method of thermally managing a turboprop-powered medium altitude long endurance aircraft, the method comprising using recirculated air passed via a heat exchanger to cool the turboprop-powered medium altitude long endurance aircraft, the heat exchanger comprising a heat-storage material.

The method may further comprise, prior to using the recirculated air passed via the heat exchanger to cool the turboprop-powered medium altitude long endurance aircraft, using ground-based cooling air to cool the heat exchanger.

The method may further comprise, after using the recirculated air passed via the heat exchanger to cool the turboprop-powered medium altitude long endurance aircraft, using ram air to cool the heat exchanger.

The method may further comprise, after using ram air to cool the heat exchanger, again using recirculated air passed via the heat exchanger to cool the turboprop-powered medium altitude long endurance aircraft.

The method may further comprise performing heating of the turboprop-powered medium altitude long endurance aircraft using heat being scavenged from an engine of the aircraft.

Conventional, sophisticated aircraft, burdened with a significant payload of electronic systems and sensors such as large scale surveillance aircraft or electronic combat and communications systems aircraft have merited associated sophisticated cooling/heating systems, with cabin pressurisation in the case of manned aircraft, and the engine power-offtake for these systems has been tolerated.

It is desirable for such aircraft to be able to fly at higher altitudes at slower speeds, for example to undertake surveillance functions more effectively. Use of a turboprop-powered propulsion system for the aircraft optimises/maximises the fuel economy and hence the duration of each mission. However, the resulting combination of a large equipment conditioning demand and a need to operate at low speeds at medium/high altitudes can create unacceptable power/air offtake demands on turboprop engines both on the ground and in flight. In many cases, the aircraft may be unmanned and so it is no longer necessary to provide the environmental conditions required when aircrew are present, making simpler system solutions possible.

By providing the aforementioned aspects of the present invention, the thermal environment required by the aircraft itself and/or the electronic systems and sensors mounted in the equipment bay to operate reliably and effectively can be maintained without additional fuel consumption or other power-offtake penalties in a very simple and flexible way. Any fuel payload can, therefore, be reserved for the propulsion unit of the aircraft to extend the duration and/or complexity of the mission to be undertaken.

DETAILED DESCRIPTION

Figure 1:
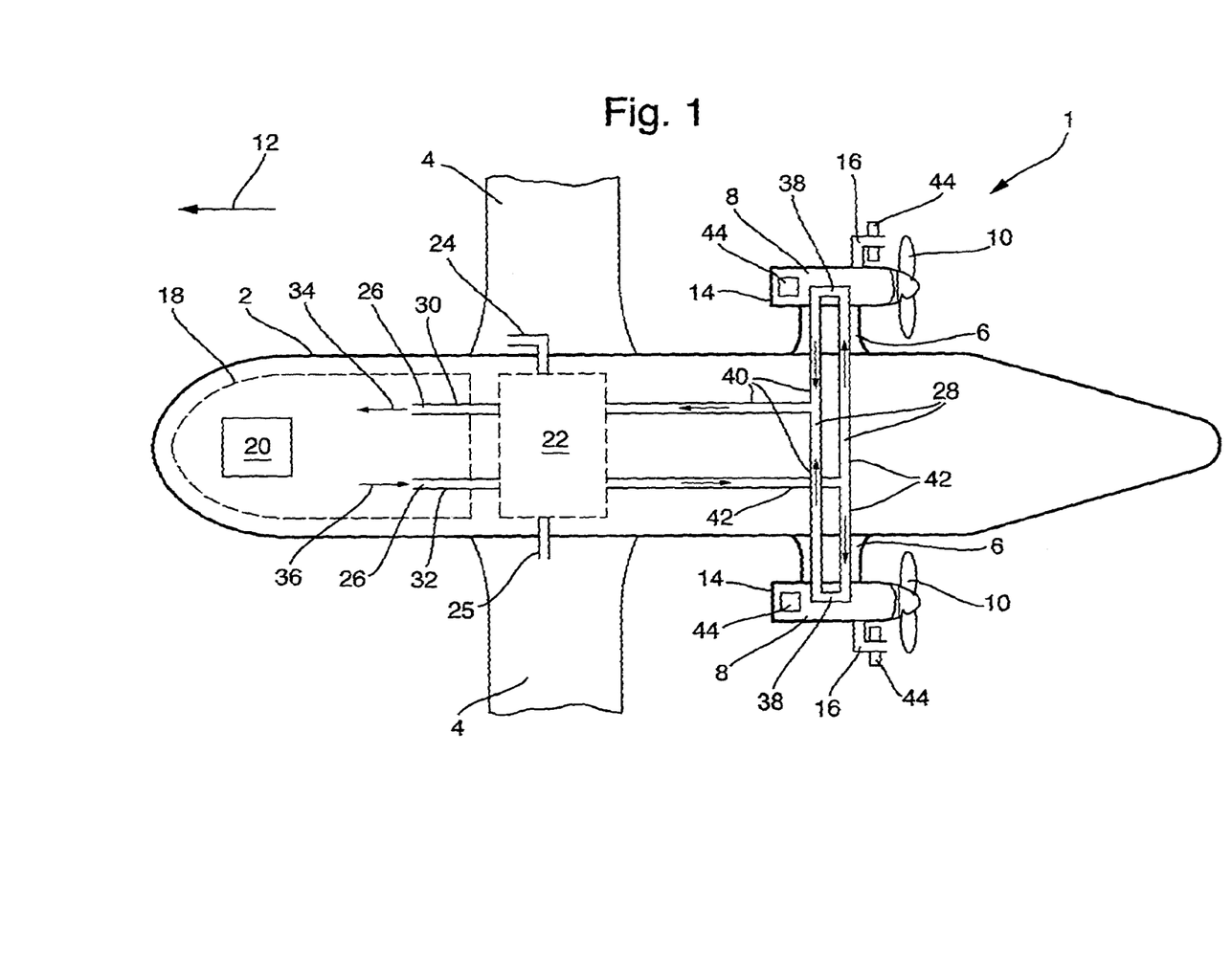
FIG. 1 is a schematic illustration (not to scale) of a turboprop-powered MALE aircraft comprising a thermal management system.

FIG. 1 is a schematic illustration (not to scale) of a turboprop-powered MALE aircraft 1 comprising a first embodiment of a thermal management system.

The turboprop-powered MALE aircraft 1 comprises a fuselage 2, wings 4 and engine support pylons 6.

Gas turbine engines 8, coupled to propellers 10, are attached to the engine support pylons 6. The gas turbine engines 8 drive the propellers 10 to provide propulsion to make the turboprop-powered MALE aircraft 1 travel in a flight direction 12. Each gas turbine engine 8 is encased in an engine casing 14, which itself is encased in a nacelle (not shown). Each gas turbine engine 8 has one or more exhaust ducts 16 (for clarity, in FIG. 1 only one exhaust duct 16 is shown for each gas turbine engine 8).

The turboprop-powered MALE aircraft 1 further comprises an equipment bay 18, which will typically carry a payload 20. The payload 20 may comprise one or more of surveillance equipment, navigation equipment, communications equipment, sensors, weapons systems, and so on.

The turboprop-powered MALE aircraft 1 further comprises a thermal control system 22.

In this embodiment, the turboprop-powered MALE aircraft 1 further comprises an air inlet 24, an air outlet 25, an air circulation path 26, and a pressurised water-glycol heat transfer loop 28, each of which are coupled to the thermal control system 22.

The air inlet 24 is arranged to input external air into the thermal control system. In this embodiment, the air inlet 24 is arranged to provide both ram air scoop functionality when in flight and an input for cool air from a ground cooling trolley (or other ground-based cooling apparatus) when on the ground (however, in other embodiments, two separate inlets may be provided, one as a ram air scoop, the other as in inlet for cool air from a ground cooling trolley). The air outlet 25 is arranged to output air after it has passed through the equipment bay. As will be explained in more detail later below, this is only used when it is not desired to recirculate the return air around the air circulation path 26 (via the thermal control system 22).

The air circulation path 26 is arranged to input air from the thermal control system 22 into the equipment bay 18 and to return the inputted air out of the equipment bay back to the thermal control system 22. In this embodiment this is implemented by the air circulation path 26 comprising a feed stage 30 and a return stage 32. In this embodiment the feed stage 30 terminates in an open-ended aperture that releases input air 34 (the term "input" being applied here to the equipment bay 18 rather than the thermal control system 22) into the equipment bay 18, and the return stage has an open-ended return aperture that allows output air 36 (the term "output" being applied here to the equipment bay 18 rather than the thermal control system 22) to return to the thermal control system. As will be explained in more detail later below, the air circulation path 26 is operated for part of the turboprop-powered MALE aircraft's mission profile in a non-recirculating manner, and for another part of the turboprop-powered MALE aircraft's mission profile in a recirculating manner.

The pressurised water-glycol heat transfer loop 28 is a closed loop recirculating liquid flow arrangement in which a water-glycol liquid mixture is kept pressurised. The pressurised water-glycol heat transfer loop 28 comprises respective heat pick up stages 38 located within each engine nacelle, a feed stage 40 arranged for the water-glycol to flow from the heat pick up stages 38 to the thermal control system 22, and a return stage 42 arranged for the water-glycol to flow from the thermal control system 22 to the heat pick up stages 38.

In this embodiment, thermal blankets 44 are fixed to one or more selected areas of both the engine casings 14 and exhaust ducts 16. (In other embodiments they may be fixed to one or more areas of only the engine casings 14, or to one or more areas of only the exhaust ducts, or additionally or instead may be fixed to any other areas that will become hot during operation of the turboprop-powered MALE aircraft such that heat may be scavenged.)

In this embodiment the thermal blankets 44 comprise capillary tubing connected to the pressurised water-glycol heat transfer loop 28 such that in operation the water-glycol mixture flowing through the pressurised water-glycol heat transfer loop 28 passes through the capillary tubing (i.e. the thermal blankets are in effect part of the pressurised water-glycol heat transfer loop 28) and is heated by the hot engine casings 14 and/or exhaust ducts 16. The thermal blankets 44 also comprise insulation arranged over the capillary tubing to substantially retain within the pressurised water-glycol heat transfer loop 28 the heat gained captured by the capillary tubing.

The thermal blankets 44 are thermally coupled to the heat pick up stages 38 of the pressurised water-glycol heat transfer loop 28. Thus, in this embodiment, in operation, heat may be scavenged by the thermal blankets 44 from the hot areas of the engine casings 14 and/or exhaust ducts 16, and transported via the heat pick up stages 38 and feed stage 40 to the thermal control system 22 which can then use or redistribute the thermal energy as desired, and as will be explained in more detail later below. It is further noted that such flow of heated water-glycol from the heat pick up stages 38 to the thermal control system 22 can, if desired, also (or instead) be used to directly heat structures of the turboprop-powered MALE aircraft 1 that lie along the route of the feed stage 40 (or other provided routing), as will be discussed in more detail later below.

The thermal management system of this embodiment comprises the thermal control system 22, the air inlet 24, the air circulation path 26, the pressurised water-glycol heat transfer loop 28, and the thermal blankets 44.

Figure 2:
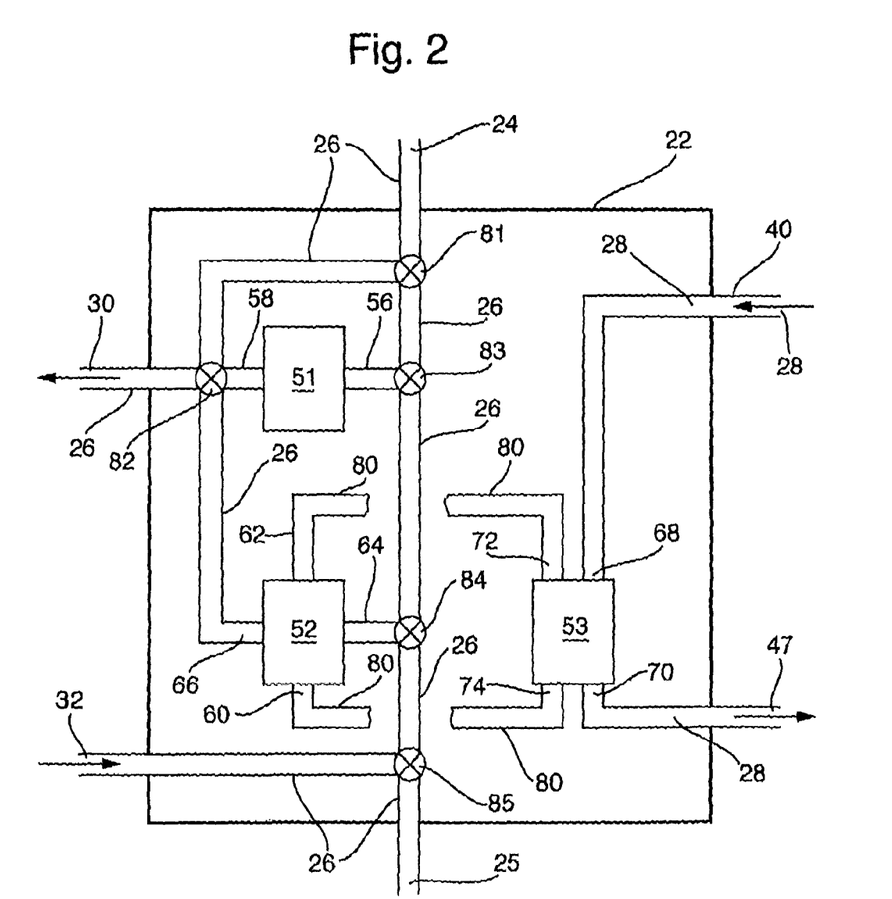
FIG. 2 is a schematic block diagram of a thermal control system that forms part of the thermal management system.

FIG. 2 is a schematic block diagram of the thermal control system 22.

In this embodiment, the thermal control system 22 comprises three heat exchangers, which for convenience will be termed the first heat exchanger 51, the second heat exchanger 52, and the third heat exchanger 53.

The first heat exchanger 51 comprises an input 56 and an output 58 that are operably coupled to (or may alternatively be considered as part of) the air circulation path 26.

The second heat exchanger 52 comprises a first input 60 and a first output 62 that are arranged to form part of one or more further fluid circulation paths, of which one such further fluid circulation path 80 is shown in FIG. 2. The second heat exchanger 52 further comprises a second input 64 and a second output 66 that are operably coupled to (or may alternatively be considered as part of) the air circulation path 26.

The air circulation path comprises various valve systems which can be operated to change the routes in which the air flows in the air circulation path, as will be explained in more detail later below. FIG. 2 shows five such valve systems, namely a first valve system 81, a second valve system 82, a third valve system 83, a fourth valve system 84, and a fifth valve system 85.

The first valve system 81 is positioned after the air inlet 24 at a 3-way junction in the air circulation path 26. In operation, the first valve system 81 can be switched between either: (i) an off condition, which blocks air entering from the air inlet 24, or (ii) a first flow condition in which air entering from the air inlet 24 is allowed to pass along a section of the air circulation path 26 to a 4-way junction in the air circulation path 26 at which the second valve system 82 is positioned, or (iii) a second flow condition in which air entering from the air inlet 24 is allowed to pass along a different section of the air circulation path 26 to another 3-way junction in the air circulation path 26 at which the third valve system 83 is positioned, or (iv) a third flow condition in which both the air flows of the first flow condition and the second flow condition are allowed to take place at the same time.

As mentioned above, the second valve system 82 is positioned at a 4-way junction in the air circulation path 26, where one of the sections of the air circulation path 26 meeting at the 4-way junction comes from the first valve system 81. The other sections meeting at the 4-way junction of the second valve system 82 are a section coming from the output 58 of the first heat exchanger 51, a section coming from the second output 66 of the second heat exchanger 52, and finally the feed stage 30 of the air circulation path 26 that feeds air into the equipment bay 18. In operation, the second valve system 82 can be switched between either: (i) a first flow condition in which air entering from the air inlet 24 and then passing through the first valve system 81 to the second valve system 82 is allowed to pass into the feed stage 30 and hence into the equipment bay 18, or (ii) a second flow condition in which air flowing from the first heat exchanger 51 to the second valve system 82 is allowed to pass into the feed stage 30 and hence into the equipment bay 18, or (iii) a third flow condition in which air output from the second output 66 of the second heat exchanger 52 is allowed to pass into the feed stage 30 and hence into the equipment bay 18.

As mentioned above, the third valve system 83 is positioned at a 3-way junction in the air circulation path 26, where one of the sections of the air circulation path 26 meeting at the 3-way junction comes from the first valve system 81. The other sections meeting at the 3-way junction of the third valve system 83 are a section coming from a 3-way junction where the fourth valve system 84 is positioned, and a section leading into the input 56 of the first heat exchanger 51. In operation, the third valve system 83 can be switched between either: (i) a first flow condition in which air entering from the air inlet 24 and then passing through the first valve system 81 to the third valve system 83 is allowed to pass into input 56 and hence into the first heat exchanger 51, or (ii) a second flow condition in which air entering from the air inlet 24 and then passing through the first valve system 81 to the third valve system 83 is allowed to pass on to the fourth valve system 84 (from where it will pass into the second heat exchanger 52), or (iii) a third flow condition in which air coming from the fourth valve system 84 is allowed to pass into input 56 and hence into the first heat exchanger 51.

As mentioned above, the fourth valve system 84 is positioned at a 3-way junction in the air circulation path 26, where one of the sections of the air circulation path 26 meeting at the 3-way junction comes from the third valve system 83. The other sections meeting at the 3-way junction of the fourth valve system 84 are a section coming from a 3-way junction where the fifth valve system 85 is positioned, and a section leading into the second input 64 of the second heat exchanger 52. In operation, the fourth valve system 84 can be switched between either: (i) a first flow condition in which air entering from the air inlet 24 and then passing through the first valve system 81 and the third valve system 83 to the fourth valve system 84 is allowed to pass into the second input 64 and hence into the second heat exchanger 52, or (ii) a second flow condition in which air coming from the fifth valve system 85 is allowed to pass on to the third valve system 83 (from where it will pass into the first heat exchanger 51), or (iii) a third flow condition in which air coming from the fifth valve system 85 is allowed to pass into the second input 64 and hence into the second heat exchanger 52.

As mentioned above, the fifth valve system 85 is positioned at a 3-way junction in the air circulation path 26, where one of the sections of the air circulation path 26 meeting at the 3-way junction goes to the fourth valve system 84. The other sections meeting at the 3-way junction of the fifth valve system 85 are the return stage 32 of the air circulation path 26 that returns air from the equipment bay 18, and a section leading to the air outlet 25. In operation, the fifth valve system 85 can be switched between either: (i) a first flow condition (which provides recirculation) in which air coming from the return stage 32 is allowed to pass on to the fourth valve system 84 (from where it will pass into either the second heat exchanger 52 or the first heat exchanger 51), or (ii) a second flow condition (when recirculation is not taking place) in which air coming from the return stage 32 is allowed to pass on to the air outlet 25 and hence exits the air circulation path 26.

In operation, the valve systems are switched as required between their different possibilities to provide one or more of the following modes of air flow operation through the air circulation path 26:

(i) the first heat exchanger 51 may be used to cool air that is passed through it, to provide cooling air to the equipment bay 18, with the air being input continuously from the air inlet 24, with air that has passed once through the equipment bay 18 being allowed to exit via the air outlet 25, i.e. recirculation is not used;

(ii) the first heat exchanger 51 may be used to cool air that is passed through it, to provide cooling air to the equipment bay 18, with the air being recirculated around the air circulation path 26 (i.e. the fifth valve system 85, the fourth valve system 84 and the third valve system 83 are set to provide the condition in which air that has been passed through the equipment bay is returned to re-enter the first heat exchanger 51);

(iii) the second heat exchanger 52 may be used to heat air that is passed through it, to provide heating air to the equipment bay 18, with the air being input continuously from the air inlet 24, with air that has passed once through the equipment bay 18 being allowed to exit via the air outlet 25, i.e. recirculation is not used;

(iv) the second heat exchanger 52 may be used to heat air that is passed through it, to provide heating air to the equipment bay 18, with the air being recirculated around the air circulation path 26 (i.e. the fifth valve system 85 and the fourth valve system 84 are set to provide the condition in which air that has been passed through the equipment bay is returned to re-enter the second heat exchanger 52).

The third heat exchanger 53 comprises a first input 68 and a first output 70 that are operably coupled to (or may alternatively be considered as part of) the pressurised water-glycol heat transfer loop 28. The third heat exchanger 53 further comprises a second input 72 and a second output 74 that are arranged to form part of one or more further fluid circulation paths. In this embodiment, one such further circulation path is the previously mentioned further fluid circulation path 80 that also enters and exits the second heat exchanger 52. Thus, in this embodiment, when the valve systems 81-85 of the air circulation path 26 are set so that the second heat exchanger 52 is used to provide heat to the air for heating the equipment bay 18, the heat is supplied from the third heat exchanger 53, which has extracted such heat from the pressurised water-glycol heat transfer loop 28, i.e. such heat has originally been scavenged by the thermal blankets 44 from hot parts of the engine casings 14 and/or exhaust ducts 16.

Figure 3:
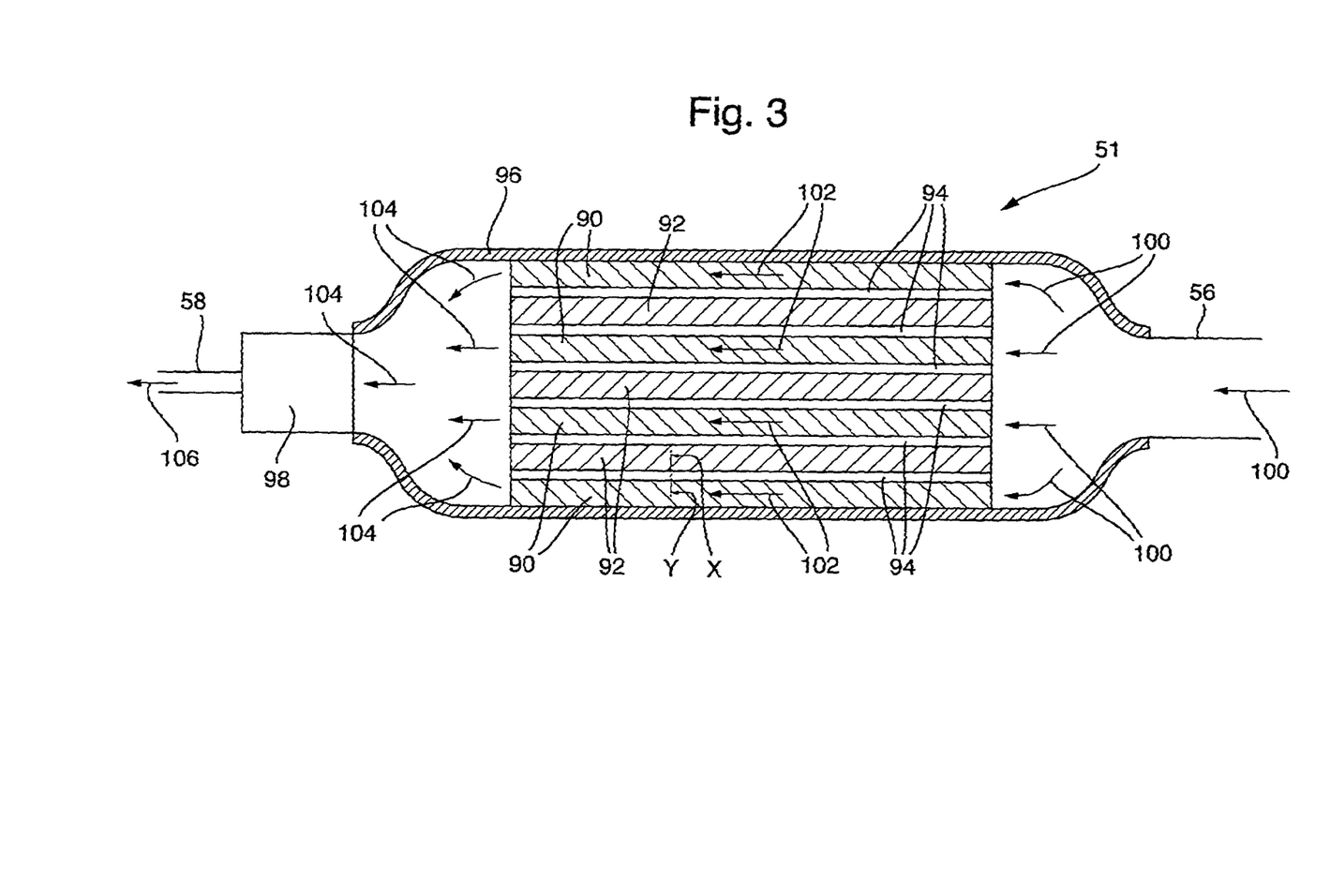
FIG. 3 is a schematic illustration (not to scale) showing certain details of a heat exchanger.

FIG. 3 is a schematic illustration (not to scale) showing certain details of the first heat exchanger 51. The first heat exchanger 51 comprises a laminated stack of air flow channels 90 interlaced with heat sink layers 92. The first heat exchanger 51 further comprises a respective thermoelectric devices 94 positioned between the air flow channels 90 and the heat sink layers 92. The laminated stack is surrounded by an insulation jacket 96. The input to the insulation jacket/laminated stack is provided by the earlier described input 56. The output of the insulation jacket/laminated stack feeds into a water extractor 98. The output of the water extractor 98 is the earlier described output 58.

In operation, input air 100 flows into the first heat exchanger 51, then flows (as indicated by reference numeral 102 in FIG. 3) along the air flow channels 90, then exits the airflow channels 90 as cooled output air 104. The cooled output air 104 then flows through water extractor 98 and then exits as cooled and dried output air 106.

More details of the air flow channels 90 and heat sink layers 92 are as follows. The air flow channels 90 are filled with open-cell aluminium foam. The heat sink layers 92 comprise open-cell aluminium foam combined with heat-storage wax, which is able to take in and store heat efficiently, e.g. without a large rise in temperature, due to high specific heat capacity or to latent heat, selectable at a suitable melting point (or put more generally, employing materials of e.g. high specific heat capacity/latent heat selected to have desired phase changing point temperatures, e.g. melting point). Any suitable heat-storage wax may be used, for example paraffin wax. The open-cell aluminium foam and the heat-storage wax are combined in any suitable manner. The terminology "combined with" as used here should be understood to mean physically mixed, integrated, dispersed or the like—i.e. the open-cell aluminium foam occupies, in a three-dimensional mesh or cell-like formation, a certain amount of space within the overall space defined by the heat sink shape, and the wax fills some or all of the remaining space, i.e. fills or partly occupies some or all of the voids within the aluminium foam structure.

Figure 4:
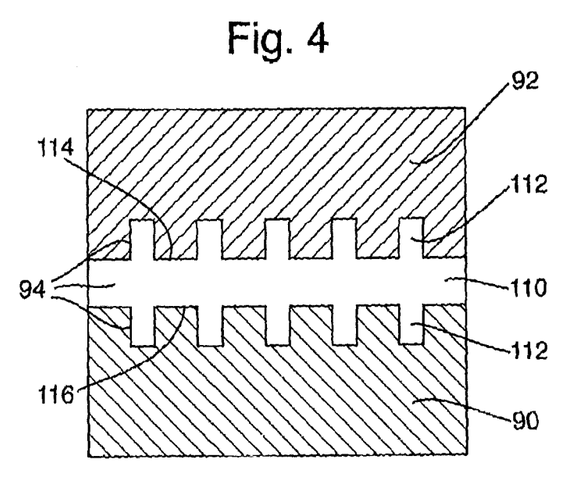
FIG. 4 shows a cross-section X-Y from FIG. 3.

A cross-section X-Y from FIG. 3 is shown in FIG. 4. More particularly, the cross-section of FIG. 4 shows certain details of the arrangement at each interface between an air flow channel 90 and a heat sink layer 92. At the interface of the heat sink layer 92 and the air flow channel 90, the heat sink layer abuts one side of the thermoelectric device 94, and the air flow channel 90 abuts the other side of the thermoelectric device 94. The thermoelectric device comprises a core part 110, and fins 112 that extend from the core part 110 on either side of the core part 110. The core part 110 is planar i.e. parallel to the planes of the heat sink layer 92 and the air flow channel 90. The fins 112 extend outwards from the core part 110. Some of the fins 112 extend from one of the planar surfaces of the core part 110 (the surface indicated by reference numeral 114 in FIG. 4) into the heat sink layer 92. The other fins 112 extend from the other of the planar surfaces of the core part 110 (the surface indicated by reference numeral 116 in FIG. 4) into the air flow channel 90.

In operation, during taxi/take-off/initial climb/approach/landing/taxi, heat is extracted from the air 102 flowing along the air flow channel 90 and transferred via the thermoelectric device 94 into the heat sink layer 92. Thus, in operation, the planar surface 114 operates as a cold face, and the planar surface 116 operates as a hot face. An electrical current is applied across the thermoelectric device 94, thus establishing an additional temperature difference between the hot face and the cold face. By such provision and use of the thermoelectric device, the heat transfer is made more efficient. The fins 112 also render the heat transfer process more efficient.

Figure 5:
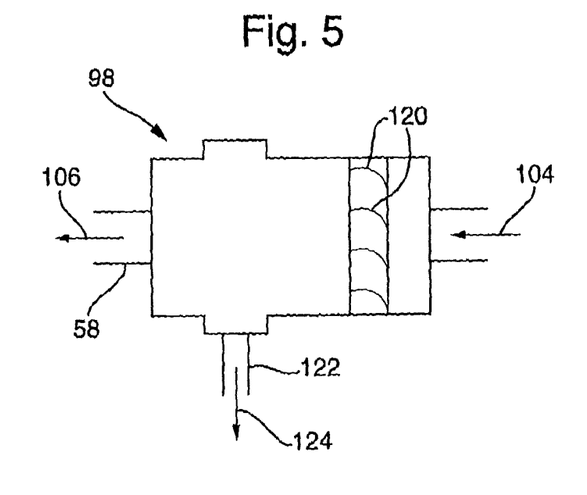
FIG. 5 shows certain details of a water extractor that is part of the heat exchanger of FIG. 3.

FIG. 5 shows certain details of the water extractor 98 of this embodiment. The water extractor 98 comprises vanes 120, a drain 122 and the previously mentioned output 58. These elements are arranged such that the cooled output air 104 passes over the vanes which swirl the air allowing liquid water to be extracted from the air by a scraper arrangement. The moisture exits the water extractor 98 in the form of water droplets 124 via the drain 122. This leaves cooled and dried output air 106 which exits the water extractor 98 (and hence the first heat exchanger 51) via the output 58.

The heat being scavenged may be transferred, via the third heat exchanger 53 and the second heat exchanger 52, to air being recirculated around the air circulation path 26 via the second heat exchanger 52, to heat the equipment bay 18. Appropriate routing and recirculation of the air may be achieved by using appropriate settings of the various valve systems 81-85 as described earlier above.) Additionally, or instead, the heat being scavenged may be transferred via the third heat exchanger 53 to other parts of the turboprop-powered MALE aircraft 1 to perform heating, for example via one or more further fluid circulation paths that pass via the third heat exchanger 53, to locations such as near to the leading edges of the wings 4 and/or engine support pylons 6, for example to prevent ice forming. Additionally, or instead, the heat being scavenged may be transferred directly to other parts of the turboprop-powered MALE aircraft 1 to perform heating, for example at least part of the feed stage 40 of the pressurised water-glycol heat transfer loop 28 may be positioned to run in locations such as near to the leading edges of the engine support pylons 6, for example to prevent ice forming. (This latter example of the feed stage 40 of the pressurised water-glycol heat transfer loop 28 being arranged to run near to the leading edges of the engine support pylons 6, for example to prevent ice forming, is particularly advantageous in view of the fact that the heat is being obtained by scavenging heat from the engines, thus the distance of travel between where the fluid gains the scavenged heat to where it is used to give up this heat to e.g. prevent ice forming, is very short and hence this process can be very efficient.)

It will be appreciated that the above described arrangements may be deployed in many advantageous ways and combinations according to the flight conditions the turboprop-powered MALE aircraft 1 will undergo before and during flight. Various examples of these flight conditions, and associated embodiments of processes of performing thermal management of the turboprop-powered MALE aircraft 1 during such flights, will now be described with reference to FIGS. 6 to 11. It will be appreciated that the air temperatures given in the below examples are merely nominal temperatures to allow further understanding, and are not limiting to the invention. Also, it will be appreciated that for clarity various example mission profiles are described below in terms of simplified discrete phases, although in practise such phases would typically merge into each other and vary more subtly.

Figure 6:
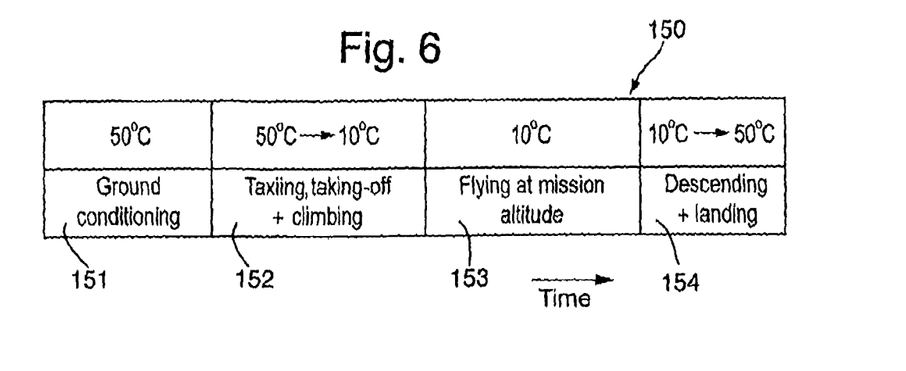
FIG. 6 is a schematic illustration of a first example of a mission profile that the turboprop-powered MALE aircraft may undergo.

FIG. 6 is a schematic illustration of a first example of a mission profile 150 that the turboprop-powered MALE aircraft 1 may undergo. For ease of reference, this example may be considered as being one in which the turboprop-powered MALE aircraft 1 experiences "hot" conditions.

During a first phase 151, the turboprop-powered MALE aircraft 1 undergoes ground conditioning, i.e. the turboprop-powered MALE aircraft 1 is on the ground and is connected to an air cooling trolley and, as desired, other ground conditioning/processing equipment. In this example the air temperature on the ground is 50° C.

During a second phase 152, the air cooling trolley and any other ground conditioning equipment is disconnected, and the turboprop-powered MALE aircraft 1 carries out taxiing, taking-off and climbing. In this example the air temperature experienced by the turboprop-powered MALE aircraft 1 during this phase is 50° C. whilst taxiing and taking off and then decreases gradually to 10° C. as the turboprop-powered MALE aircraft 1 climbs to its mission altitude.

During a third phase 153, the turboprop-powered MALE aircraft 1 flies at its mission altitude, where in this example the air temperature is 10° C.

During a fourth phase 154, the turboprop-powered MALE aircraft 1 descends, lands, and taxis in, thereby experiencing in this example an air temperature that rises from 10° C. to 50° C. over the course of the fourth phase 154.

In this first mission profile 150, the duration of each of the first phase 151 and third phase 153 is very long compared to the duration of the second phase 152 and the fourth phase 154. This will typically arise due to the particular characteristics of the turboprop-powered MALE aircraft 1, in particular its long endurance flight capability. For example, the third phase 153 may be longer than 12 hours, whereas the second phase 152 may be less than 30 minutes.

Figure 7:
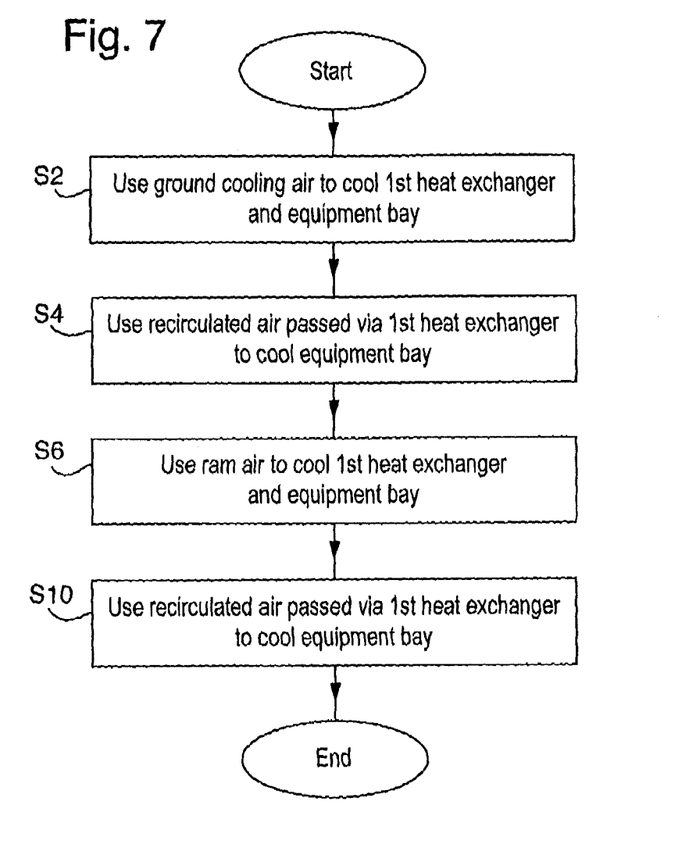
FIG. 7 is a process flowchart showing certain steps performed in a thermal management process that may advantageously be employed by the turboprop-powered MALE aircraft during the above mentioned first example of a mission profile.

FIG. 7 is a process flowchart showing certain steps performed in a thermal management process that may advantageously be employed by the turboprop-powered MALE aircraft 1 during the above described first example of a mission profile 150.

At step s2, during the above described first phase 151 of the first example of a mission profile 150, the thermal control system 22 is operated such as to use ground cooling air from the ground cooling trolley input via the air inlet 24 to cool the first heat exchanger 51 and the equipment bay 18, and after performing such cooling on a single pass through the equipment bay 18, this air is allowed to exit thermal control system 22 via the air outlet 25, by using appropriate settings of the various valve systems 81-85 as described earlier above. During this process the heat-storage wax in the heat sink layers 92 of the first heat exchanger 51 are solidified by virtue of being cooled by the readily available cool air from the ground cooling trolley. Optionally, this process may be enhanced by applying electrical power to the thermo-electric device 94.

At step s4, during the above described second phase 152, air is recirculated in the air circulation path 26 and is cyclically passed via the first heat exchanger to cool the equipment bay 18, by using appropriate settings of the various valve systems 81-85 as described earlier above. During this process, for the relatively short time of the above described second phase 152, due to the specific/latent heat of the solidified heat-storage wax, as the heat-storage wax is melted by the warm air, the first heat exchanger is able to efficiently cool the recirculating air that is being used to cool the equipment bay 18.

At step s6, during the above described third phase 153, the external air is now cool enough to be used for cooling the equipment bay 18, and so ram air scooped in via the air inlet 24 is used to cool the first heat exchanger 51 and the equipment bay 18, and after performing such cooling on a single pass by, this air is allowed to exit thermal control system 22 via the air outlet 25, by using appropriate settings of the various valve systems 81-85 as described earlier above. During this process the heat-storage wax in the heat sink layers 92 of the first heat exchanger 51 are solidified by virtue of being cooled by the readily available cool air from the ram air scoop. (Note, in flights where the first heat exchanger 51, and hence the heat storage properties of the heat storage wax, will not be needed for the following fourth phase 154, then during the third phase 153 the ram air may be used just to cool the equipment bay 18, thereby requiring less ram air, or tolerating warmer ram air, for example.)

At step s10, during the above described fourth phase 154, air is recirculated in the air circulation path 26 and is cyclically passed via the first heat exchanger 51 to cool the equipment bay 18, by using appropriate settings of the various valve systems 81-85 as described earlier above. During this process, for the relatively short time of the above described fourth phase 154, due to the specific/latent heat of the solidified heat-storage wax, as the heat-storage wax is melted by the warm air, the first heat exchanger 51 is able to efficiently cool the recirculating air that is being used to cool the equipment bay 18.

Figure 8:
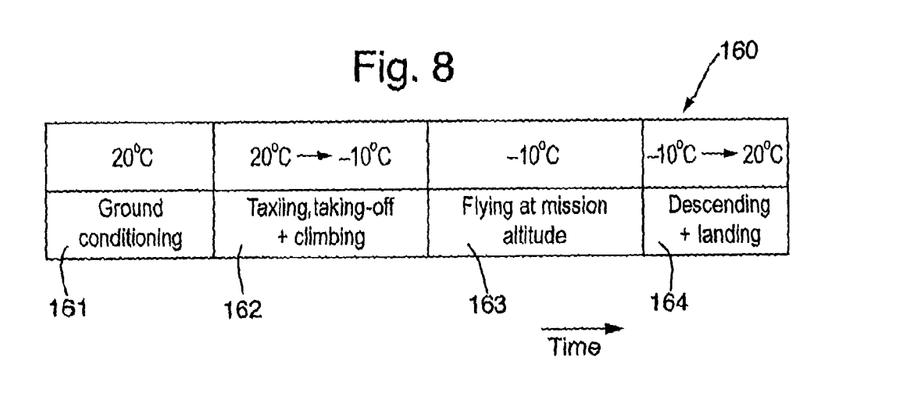
FIG. 8 is a schematic illustration of a second example of a mission profile that the turboprop-powered MALE aircraft may undergo.

FIG. 8 is a schematic illustration of a second example of a mission profile 160 that the turboprop-powered MALE aircraft 1 may undergo. For ease of reference, this example may be considered as being one in which the turboprop-powered MALE aircraft 1 experiences "mild, but cold at altitude" conditions.

During a first phase 161, the turboprop-powered MALE aircraft 1 is on the ground and undergoes general ground conditioning, but since in this example the air temperature on the ground is 20° C., no specialised cooling or heating is required.

During a second phase 162, the turboprop-powered MALE aircraft 1 carries out taxiing, taking-off and climbing. In this example the air temperature experienced by the turboprop-powered MALE aircraft 1 during this phase is 20° C. whilst taxiing and taking off and then decreases gradually to −10° C. as the turboprop-powered MALE aircraft 1 climbs to its mission altitude. In this example during this second phase 162 no specialised cooling or heating is required (e.g. in this simplified account let us assume the climb is sufficiently rapid that any cooling induced by the external air is insignificant until the following third phase is reached).

During a third phase 163, the turboprop-powered MALE aircraft 1 flies at its mission altitude, where in this example the air temperature is −10° C. In this example we assume this is the only phase where heating is required to be performed, which heating will be described in more detail below with reference to FIG. 9.

During a fourth phase 164, the turboprop-powered MALE aircraft 1 descends and lands, thereby experiencing in this example an air temperature that rises from −10° C. to 20° C. over the course of the fourth phase 164.

In this second mission profile 160, the duration of the third phase 163 is very long compared to the duration of each of the other phases. This will typically arise due to the particular characteristics of the turboprop-powered MALE aircraft 1, in particular its long endurance flight capability/requirement. For example, the third phase 163 may be longer than 12 hours, even longer than 24 hours. More generally, it is desirable in this type of aircraft for the available endurance to be as long as possible.

Figure 9:
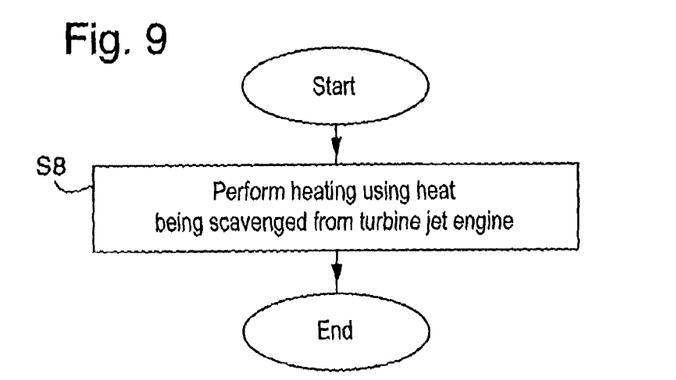
FIG. 9 is a process flowchart showing a certain step performed in a thermal management process that may advantageously be employed by the turboprop-powered MALE aircraft during the above mentioned second example of a mission profile.

FIG. 9 is a process flowchart showing a certain step performed in a thermal management process that may advantageously be employed by the turboprop-powered MALE aircraft 1 during the above described second example of a mission profile 160.

In this thermal management process, the step s8 is performed during the above described third phase 163 of the second example of a mission profile 160. At step s8, heating is performed using heat that is being scavenged from one or more hot parts of the gas turbine engine 8, for example in the manner described earlier above employing the thermal blankets 44. The heat being scavenged may be transferred, via the third heat exchanger 53 and the second heat exchanger 52, to air being recirculated around the air circulation path 26 via the second heat exchanger 52, to heat the equipment bay 18. (Again, appropriate routing and recirculation of the air is achieved by using appropriate settings of the various valve systems 81-85 as described earlier above.) Additionally, or instead, the heat being scavenged may be transferred via the third heat exchanger 53 to other parts of the turboprop-powered MALE aircraft 1 to perform heating, for example via one or more further fluid circulation paths that pass via the third heat exchanger 53, to locations such as near to the leading edges of the wings 4 and/or engine support pylons 6, for example to prevent ice forming. Additionally, or instead, the heat being scavenged may be transferred directly to other parts of the turboprop-powered MALE aircraft 1 to perform heating, for example at least part of the feed stage 40 of the pressurised water-glycol heat transfer loop 28 may be positioned to run in locations such as near to the leading edges of the engine support pylons 6, for example to prevent ice forming. (This latter example of the feed stage 40 of the pressurised water-glycol heat transfer loop 28 being arranged to run near to the leading edges of the engine support pylons 6, for example to prevent ice forming, is particularly advantageous in view of the fact that the heat is being obtained by scavenging heat from the engines, thus the distance of travel between where the fluid gains the scavenged heat to where it is used to give up this heat to e.g. prevent ice forming is very short and hence this process can be very efficient.)

Figure 10:
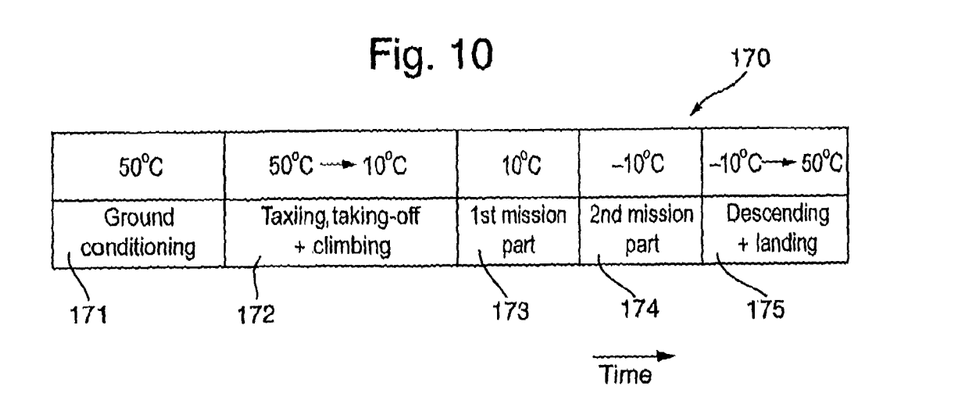
FIG. 10 is a schematic illustration of a third example of a mission profile that the turboprop-powered MALE aircraft may undergo.

FIG. 10 is a schematic illustration of a third example of a mission profile 170 that the turboprop-powered MALE aircraft 1 may undergo. For ease of reference, this example may be considered as being one in which the turboprop-powered MALE aircraft 1 experiences "hot ground conditions and a mixture of hot and cold conditions at altitude".

During a first phase 171, the turboprop-powered MALE aircraft 1 undergoes ground conditioning, i.e. the turboprop-powered MALE aircraft 1 is on the ground and is connected to an air cooling trolley and as desired, other ground conditioning/processing equipment. In this example the air temperature on the ground is 50° C.

During a second phase 172, the air cooling trolley and any other ground conditioning equipment is disconnected, and the turboprop-powered MALE aircraft 1 carries out taxiing, taking-off and climbing. In this example the air temperature experienced by the turboprop-powered MALE aircraft 1 during this phase is 50° C. whilst taxiing and taking off and then decreases gradually to 10° C. as the turboprop-powered MALE aircraft 1 climbs to its mission altitude.

During a third phase 173, the turboprop-powered MALE aircraft 1 flies a first part of its mission, during which in this example the air temperature is 10° C.

During a fourth phase 174, the turboprop-powered MALE aircraft 1 flies a second part of its mission, during which in this example the air temperature is −10° C. Various reasons are possible for why there is a different external air temperature during the second part of the mission compared to the first part of the mission. One possibility is the second part of the mission takes place at a higher altitude than the first part. Another possibility is that due to the long flight duration characteristics of the turboprop-powered MALE aircraft 1, the first part of the mission is e.g. during the warmer day and the second part is during the e.g. colder night. In this example we assume this fourth phase 174 is the only phase where heating is required to be performed, which heating will be described in more detail below with reference to FIG. 11.

During a fifth phase 175, the turboprop-powered MALE aircraft 1 descends and lands, thereby experiencing in this example an air temperature that rises from −10° C. to 50° C. over the course of the fifth phase 175.

In this third mission profile 170, the duration of each of the first phase 171, the third phase 173, and the fourth phase 174 is very long compared to the duration of the second phase 172 and the fifth phase 175. This will typically arise due to the particular characteristics of the turboprop-powered MALE aircraft 1, in particular its long endurance flight capability. For example, the third phase 173 and the fourth phase may each be longer than 6 or 12 hours, whereas the second phase 172 may be less than 30 minutes.

Figure 11:
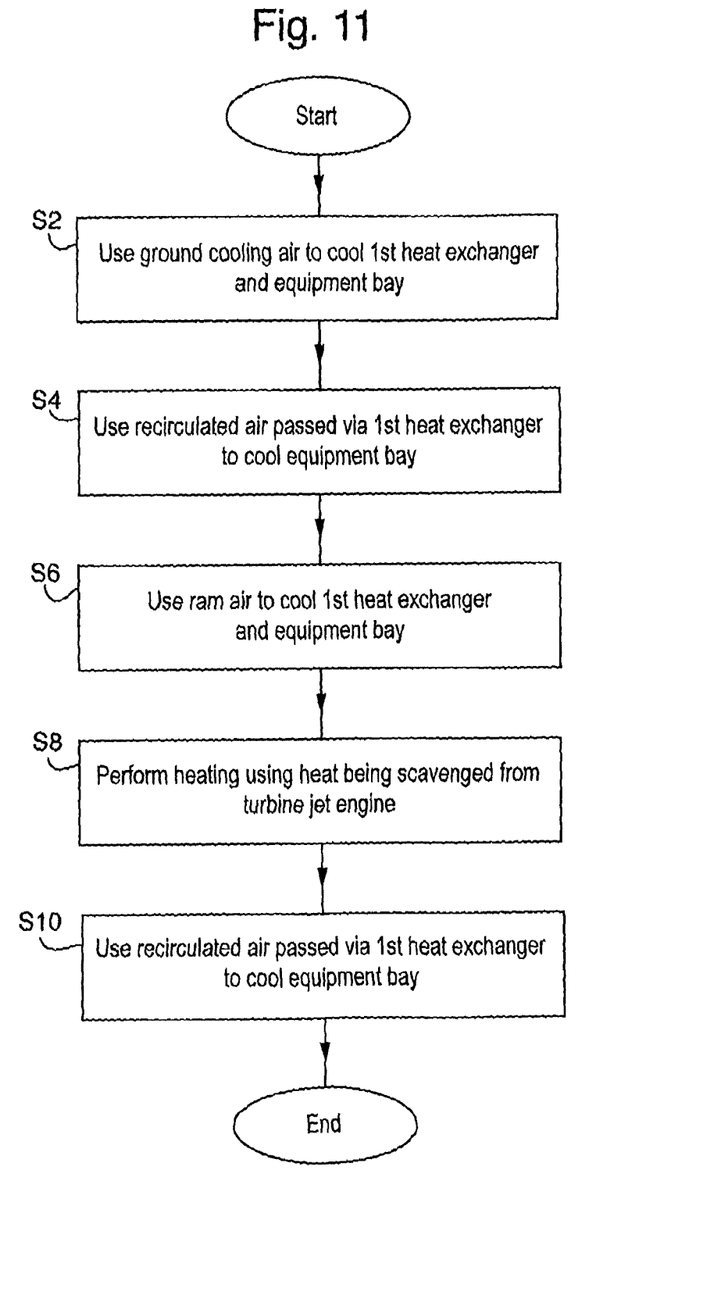
FIG. 11 is a process flowchart showing certain steps performed in a thermal management process that may advantageously be employed by the turboprop-powered MALE aircraft during the above described third example of a mission profile.

FIG. 11 is a process flowchart showing certain steps performed in a thermal management process that may advantageously be employed by the turboprop-powered MALE aircraft 1 during the above described third example of a mission profile 170.

At step s2, during the above described first phase 171 of the third example of a mission profile 170, the thermal control system 22 is operated such as to use ground cooling air from the ground cooling trolley input via the air inlet 24 to cool the first heat exchanger 51 and the equipment bay 18, and after performing such cooling on a single pass through the equipment bay 18, this air is allowed to exit thermal control system 22 via the air outlet 25, by using appropriate settings of the various valve systems 81-85 as described earlier above. During this process the heat-storage wax in the heat sink layers 92 of the first heat exchanger 51 are solidified by virtue of being cooled by the readily available cool air from the ground cooling trolley. Optionally, cooling of the heat storage wax may be enhanced by applying electrical power to the thermo-electric device 94.

At step s4, during the above described second phase 172, air is recirculated in the air circulation path 26 and is cyclically passed via the first heat exchanger 51 to cool the equipment bay 18, by using appropriate settings of the various valve systems 81-85 as described earlier above. During this process, for the relatively short time of the above described second phase 172, due to the specific/latent heat of the solidified heat-storage wax, as the heat-storage wax is melted by the warm air, the first heat exchanger is able to efficiently cool the recirculating air that is being used to cool the equipment bay 18.

At step s6, during the above described third phase 173, the external air is now cool enough to be used for cooling the equipment bay 18, and so ram air scooped in via the air inlet 24 is used to cool the first heat exchanger 51 and the equipment bay 18, and after performing such cooling on a single pass through the equipment bay 18, this air is allowed to exit thermal control system 22 via the air outlet 25, by using appropriate settings of the various valve systems 81-85 as described earlier above. During this process the heat-storage wax in the heat sink layers 92 of the first heat exchanger 51 are solidified by virtue of being cooled by the readily available cool air from the ram air scoop. (Note, in flights where the heat-storage wax will not be needed for the later fifth phase 155, then during the third phase 173 the ram air may be used just to cool the equipment bay 18, thereby requiring less ram air, or tolerating warmer ram air, for example.)

At step s8, during the above described fourth phase 174, heating is performed using heat that is being scavenged from one or more hot parts of the gas turbine engine 8, for example in the manner described earlier above employing the thermal blankets 44. The heat being scavenged may be transferred via the third heat exchanger 53 and the second heat exchanger 52 to air being recirculated around the air circulation path 26 via the second heat exchanger 52 to heat the equipment bay 18. (Again, appropriate routing and recirculation of the air is achieved by using appropriate settings of the various valve systems 81-85 as described earlier above.) Additionally, or instead, the heat being scavenged may be transferred via the third heat exchanger 53 to other parts of the turboprop-powered MALE aircraft 1 to perform heating, for example via one or more further fluid circulation paths that pass via the third heat exchanger 53 to locations such as near to the leading edges of the wings 4 and/or engine support pylons 6, for example to prevent ice forming. Additionally, or instead, the heat being scavenged may be transferred directly to other parts of the turboprop-powered MALE aircraft 1 to perform heating, for example at least part of the feed stage 40 of the pressurised water-glycol heat transfer loop 28 may be positioned to run in locations such as near to the leading edges of the engine support pylons 6, for example to prevent ice forming. (This latter example of the feed stage 40 of the pressurised water-glycol heat transfer loop 28 being arranged to run near to the leading edges of the engine support pylons 6, for example to prevent ice forming, is particularly advantageous in view of the fact that the heat is being obtained by scavenging heat from the engines, thus the distance of travel between where the fluid gains the scavenged heat to where it is used to give up this heat to e.g. prevent ice forming is very short and hence this process can be very efficient. A corresponding advantage is obtained in further embodiments where engines are mounted on the wings, and icing prevention of the leading edges of those wings is performed by direct routing of heat scavenged from the engine mounted nearby on the respective wing.)

At step s10, during the above described fifth phase 175, air is recirculated in the air circulation path 26 and is cyclically passed via the first heat exchanger 51 to cool the equipment bay 18, by using appropriate settings of the various valve systems 81-85 as described earlier above. During this process, for the relatively short time of the above described fifth phase 175, due to the specific/latent heat of the solidified heat-storage wax, as the heat-storage wax is melted by the warm air, the first heat exchanger 51 is able to efficiently cool the recirculating air that is being used to cool the equipment bay 18.

In the processes of FIGS. 9 and 11, in addition to some of the heat that is being scavenged from the gas turbine engines 8 being used to heat air in the air circulation path 26 in order to heat the equipment bay 18, some of the heat that is being scavenged may instead be directly or indirectly (via the third heat exchanger 53) transferred to other parts of the turboprop-powered MALE aircraft 1 to perform heating, for example at near to the leading edges of the engine support pylons 6 and/or the wings 4. This is performed at different times during a flight to when cool air is being used to cool the equipment bay 18 (or when no such cooling takes place on a flight, or at least when only minimal hotspot-avoiding air conditioning is taking place). However, in other embodiments, at the same time that heat that is being scavenged is directly or indirectly (via the third heat exchanger 53) being transferred to other parts of the turboprop-powered MALE aircraft 1 to perform heating, for example at near to the leading edges of the engine support pylons 6 and/or the wings 4, cooling of the equipment bay 18 may be carried out, this may occur when the outside air temperature is cold enough that various parts of the turboprop-powered MALE aircraft 1 such as leading edges need heating to prevent ice formation, yet at the same time the equipment in the equipment bay 18 produces levels of heat high enough for the equipment to still need to be cooled even though the outside of the turboprop-powered MALE aircraft 1 requires heating. In terms of the flowchart of FIG. 11, this implementation may be considered to be shown in FIG. 11, but noting that although steps such as s8 and s10 have, for convenience and ease of understanding, been depicted as discrete temporally-sequential steps, nevertheless such process steps may in fact be performed simultaneously or at least overlapping to some extent temporally.

The various cooling and heating operations described above in e.g. the processes of FIGS. 7, 9 and 11 may be selected as required for a given turboprop-powered MALE aircraft 1 according to the particular details of a given flight. In other words, the turboprop-powered MALE aircraft 1 is equipped with the various elements described above, and these are selected to be used as required. This advantageously provides a "one system suits all" solution that can be fitted as standard to plural aircraft and which renders the aircraft capable of operating in differing environments and for differing roles. Another possibility, however, is to select in advance just certain parts of the above described overall system, for aircraft that are only intended to operate in a more limited range of conditions or roles. For example only the elements necessary to provide one or more of the types of heating referred to in the process of FIG. 9 may be included, i.e. without any of the elements used for cooling. Another possibility, for example, is that only the elements necessary to provide the cooling process of FIG. 7 may be provided, i.e. without any of the elements for the heating processes described. Yet another possibility is that elements for cooling and heating are provided, but the heating does not include those elements required to provide heating of the equipment bay. Within all the whole range of possibilities, circumstances/requirements exist where one or more of the heat exchangers may be omitted, or where the second heat exchanger 52 and the third heat exchanger 53 may be implemented as a common heat exchanger (either along with, or without, depending on the particular implementation, the first heat exchanger 51).

In the above embodiments the turboprop-powered MALE aircraft 1 is an unmanned aircraft, i.e. an unmanned air vehicle (UAV), however this need not be the case, and in other embodiments the aircraft may be manned.

In other embodiments, more than one equipment bay is cooled/heated. In other embodiments, areas or parts of the aircraft other than an equipment bay as such may be air cooled/heated, either in addition to or instead of the above described equipment bay.

In the above described embodiments the various components of the thermal control system are located together physically as well as operably. However, this need not be the case, and in other embodiments any one or more of the above described components may be distributed at various locations within the aircraft.

Many elements and details described with regard to the above particular embodiments, whilst individually or in combination advantageous, are nevertheless not essential. For example, in simplified embodiments, any one or more of the following detailed elements may be omitted.

For ground cooling, any appropriate ground-based cooling apparatus may be used, not just a ground cooling trolley as such.

Separate air inlets may be provided for ground cooling and ram air scoop cooling.

The air outlet 25 may be omitted, with air that has extracted heat from the equipment bay being allowed to escape directly from the equipment bay by leakage or other general diffusion or dissipation ways without returning to the thermal control system 22. If required, when the air is to be recirculated, active methods (e.g. a fan or a suction method) may be employed to direct the air from the equipment bay 18 back into the thermal control system 22.

The particular valve systems arrangement shown may be replaced by any appropriate routing and control process. For example, a simpler routing arrangement and/or less valve systems may be employed, for example if fewer options are required to be available in a given turboprop-powered MALE aircraft. Another possibility is that the various functions provided by different parts of the single air circulation path 26 (with the different functions selected by different settings of the valve systems) can instead be implemented by providing plural separate alternative air circulation paths, e.g. each with their own entry into and/or out of the equipment bay, and operationally selecting between them as required.

The choice of the heat transfer liquid in the pressurised water-glycol heat transfer loop 28 is not essential, and instead any other appropriate heat transfer liquid may be used. Possibilities include PAO (poly alpha olefin), and "Coolanol" (trademark).

The thermal blankets 44 need not necessarily be placed on the engine casings 14 and/or the exhaust ducts 16, and may instead be placed anywhere heat can be scavenged, e.g. at other locations in or near the gas turbine engines.

One particular advantage of the use of the thermal blankets 44 is that they can be applied in a retrofit fashion to existing engine designs. However, the heat scavenging apparatus need not be the above described thermal blankets, and instead (or in addition) other suitable types of heat scavenging/heat extraction equipment may be used, such as engine oil heat exchangers.

Another possibility is that heat may instead or in addition be scavenged from the heat given out by the engines by scavenging the heat from the exhaust gases of the engines. For example, exhaust gas to water-glycol heat exchangers may be incorporated into modified engine exhaust ducts.

In further embodiments, heat provided when required to the air circulation path 26 for heating the equipment bay 18 is obtained by being extracted in conventional fashion from the propulsion power, e.g. by taking bleed air form the gas turbine engine or by extracting shaft power. Although in these embodiments the advantages related to avoiding loss of propulsion power are no longer achieved, nevertheless the overall arrangement is still advantageous compared to prior art arrangements, since a simple combined air heating/air cooling arrangement for the equipment bay is provided, that provides not only the advantages of the above described cooling aspects, but also additionally makes use of the air flow routes etc. for the equipment bay when the equipment bay becomes too cold. Thereby a flexible thermal management solution for a turboprop-powered MALE aircraft is provided that can nevertheless accommodate widely varying environmental circumstances and different mission profiles.

In some of the embodiments described above, scavenged heat is used to warm parts of the aircraft, for example leading edges of wings and/or pylons to prevent icing. In further embodiments, such heating for the prevention of icing is in addition or instead applied to other areas of the aircraft, for example to engine air intake lips.

More generally, in yet further embodiments, the scavenged heat is used in addition or instead to heat the fuel being carried by the aircraft, e.g. by delivering some or all of the scavenged heat to, or to the vicinity of, one or more fuel tanks or fuel supply lines of the aircraft. This will improve the temperature control of the fuel, and e.g. prevent or diminish fuel waxing.

In the above described embodiments, the configuration of the aircraft, and in particular the configuration of the engine positions, is as described above and shown with reference to FIG. 1, i.e. one engine is provided on each of two laterally extending engine-mounting pylons. However, in other embodiments, any other configuration may be used, as desired. For example, one possibility is that a configuration of similar layout to the aircraft of FIG. 1 may be employed, but with more than one engine on each pylon. For example, another possibility is that, instead of or in addition to engines mounted on the pylons, an engine may be mounted on a tail fin. Another possibility is that, in addition to or instead of engines mounted on engine mounting pylons and/or a tail fin, one or more engines may be mounted on each wing.

The fins 112 of the thermoelectric devices 94 may be omitted. Indeed, the thermoelectric devices 94 themselves may be omitted.

Instead of plural air flow channels 90 and plural heat sink layers 92, there may be just one of either or both of these items. Also, it will be appreciated that the particular number of channels and heat sinks shown in Figure in FIG. 3 is merely one possible example that may be used.

The air flow channels 90 of the first heat exchanger 51 need not contain open-cell aluminium foam. One possibility is for the air flow channels 90 to contain a different type of thermally conducting three-dimensional mesh arrangement that allows air to flow. Another possibility is that the air flow channel can simply be hollow.

The heat sink layers 92 of the first heat exchanger 51 need not comprise open-cell aluminium foam. One possibility is the heat-storage wax (or other heat-storage material) may be combined with a different type of three-dimensional thermally conducting mesh arrangement. Another possibility is the heat sink layer 92 may comprise just heat-storage wax (or other heat-storage material).

Any suitable heat-storage wax may be used, for example paraffin wax. Another possibility is that instead of heat-storage wax, other suitable types of heat-storage material may be used.

Other items, such as the insulation jacket 96, the water extractor 98, and so on, are also of course not essential, and may be omitted. When included, the details of, or the types of, such items may be different to those described in the above embodiments. For example, different types of water extractor may be employed compared to the one described above.

Similarly, many details, such as the shape of the first heat exchanger 51, the air flow channels 90 and the heat sink layers 92 etc. may be different. For example, a circular cross-sectional design may be implemented instead of the planar design shown in FIGS. 3 and 4.

It will be appreciated that the various embodiments described herein tend to provide, inter alia, one or more of the following advantages.

At least some of the embodiments provide a means for capturing heat that reduces or removes completely any need to extract heat from the power being provided for propulsion. This is advantageous in view of the long endurance requirement for a turboprop-powered MALE aircraft, i.e. propulsion power can be kept for contributing to extended flight endurance.

One particular advantage of the use of the thermal blankets 44 is that they can be applied in a retrofit fashion to existing engine designs.

At least some of the embodiments provide a cooling arrangement that does not need to use active air conditioning.

At least some of the embodiments provide an intermediate cooling process for an intermediate part of the mission profile, which intermediate part occurs between parts that are relatively straightforward to service in terms of providing conventional cooling arrangements. In the intermediate part, the aircraft may be required to be stationary, perform taxiing to a take-off position, perform take-off and then climb to an operational altitude, or by completing the final descent, approach to landing and taxi in. Advantageously some or all of the embodiments provide an efficient solution for the cooling operation during such an intermediate stage that does not unduly complicate the simple cooling processes that may be used for the other stages. Such solutions are particularly efficient during their limited time of deployment, and that particular efficiency tends to be derived at least in part by making use of the very fact that it is only required to carry out the cooling role for a short limited duration of the intermediate stage, and moreover advantageously tends to be easily "reset" during e.g. the first stage of the turboprop-powered MALE aircraft's next mission or during cruise at altitude with respect to preparing for the landing phase of that mission.

At least some of the embodiments provide a thermal management arrangement for a turboprop-powered MALE aircraft that is able to provide several of the above solutions in a turboprop-powered MALE aircraft such that they can be selected individually or in combination according to particular flight conditions a turboprop-powered MALE aircraft undergoes on the same or different flights.

In various of the above described embodiments, advantageous implementations that additionally include heating aspects including heat scavenging aspects, and/or particular constructional details of the first heat exchanger 51, are included. However, it is to be noted that in simpler embodiments, no heating aspects, e.g. no heat scavenging aspects, are included, and/or no particular constructional details of the first heat exchanger 51 are included. In other words, it is to be appreciated that simple embodiments of a turboprop-powered MALE aircraft (and a corresponding method of thermally managing a turboprop-powered MALE aircraft) comprise a thermal management system that need perform only cooling and that need comprise only a heat exchanger comprising a heat-storage material, and an air recirculation path for recirculating air cooled by that heat exchanger.

What is claimed is:

1. A turboprop-powered medium altitude long endurance aircraft, comprising:
   a heat exchanger having an air flow channel interlaced with a heat-storage material;
   an air inlet arranged to input external air from ground-based cooling air and/or a ram air scoop directly into the air flow channel so as to cool the heat-storage material; and
   an air recirculation path including the air flow channel; wherein
   the heat exchanger is configured to cool recirculating air flowing through the air flow channel; and
   the air recirculation path is arranged to allow the recirculating air to provide cooling from the air flow channel to the turboprop-powered medium altitude long endurance aircraft.

2. A turboprop-powered medium altitude long endurance aircraft according to claim 1, wherein the air inlet is configured to provide an input for ground-based cooling apparatus such that the heat-storage material will be cooled by the ground-based cooling apparatus when the aircraft is on the ground.

3. A turboprop-powered medium altitude long endurance aircraft according to claim 1, wherein the air inlet is configured to provide ram air scoop functionality such that the heat-storage material will be cooled by ram air during aircraft flight.

4. A turboprop-powered medium altitude long endurance aircraft according to claim 2, wherein the heat-storage material has a melting point selected so as to be rendered solid when cooling is to be performed by the ground-based cooling apparatus when the aircraft is on the ground and/or by ram air during aircraft flight.

5. A turboprop-powered medium altitude long endurance aircraft according to claim 3, wherein the heat-storage material has a melting point selected so as to be rendered solid when cooling is to be performed by a ground-based cooling apparatus when the aircraft is on the ground and/or by the ram air during aircraft flight.

6. A turboprop-powered medium altitude long endurance aircraft according to claim 1, wherein the heat-storage material has a melting point selected so as to undergo melting to assist heat capturing characteristics of the heat storage material when cooling air is recirculating around the air recirculation path.

7. A turboprop-powered medium altitude long endurance aircraft according to claim 1, wherein the air recirculation path is arranged to provide cooling to an aircraft equipment bay.

8. A turboprop-powered medium altitude long endurance aircraft according to claim 1, wherein the heat exchanger comprises:
   a heat sink; wherein
   the heat sink is thermally coupled to the air flow channel and configured such that in operation heat will be extracted from air flowing along the air flow channel and the extracted heat will be stored in the heat sink; and
   the heat sink includes the heat-storage material, the heat-storage material having a melting point selected relative to a temperature of air intended to be cooled such that the heat-storage material will be initially solid and then will melt or start to melt while extracting and storing heat from air flowing along the air flow channel.

9. A turboprop-powered medium altitude long endurance aircraft according to claim 1, wherein the heat-storage material is a heat-storage wax.

10. A turboprop-powered medium altitude long endurance aircraft according to claim 9, wherein the heat-storage wax is paraffin wax.

11. A method of thermally managing a turboprop-powered medium altitude long endurance aircraft, the method comprising:
   providing a heat exchanger having an air flow channel interlaced with a heat-storage material;
   using external air input from ground-based cooling air and/or a ram air scoop directly into the heat exchanger from an air inlet via the air flow channel to cool the heat-storage material; and
   cooling, after using the external air input from ground-based air and/or the ram air scoop to cool the heat-storage material of the heat exchanger, the turboprop-powered medium altitude long endurance aircraft with recirculated air passed via the air flow channel.

12. A method according to claim 11, comprising:
   cooling, with ground-based cooling air input into the heat exchanger from the air inlet, the heat-storage material of the heat exchanger prior to using the recirculated air passed via the heat exchanger to cool the turboprop-powered medium altitude long endurance aircraft.

13. A method according to claim 11, comprising:
   cooling, with ram air input into the heat exchanger from the air inlet, the heat-storage material of the heat exchanger after using the recirculated air passed via the heat exchanger to cool the turboprop-powered medium altitude long endurance aircraft.

14. A method according to claim 13, comprising:
   cooling, after using ram air to cool the heat-storage material of the heat exchanger, the turboprop-powered medium altitude long endurance aircraft with recirculated air passed via the heat exchanger.

15. A method according to claim 11, comprising:
   performing heating of the turboprop-powered medium altitude long endurance aircraft with heat scavenged from an engine of the aircraft.

16. A method according to claim 11, comprising:
cooling, after using ground-based air to cool the heat-storage material of the heat exchanger, the turboprop-powered medium altitude long endurance aircraft with recirculated air passed via the heat exchanger.

17. A method according to claim 11, comprising:
cooling, with ground-based cooling air input into the heat exchanger from the air inlet, the heat-storage material of the heat exchanger prior to using the recirculated air passed via the heat exchanger to cool the turboprop-powered medium altitude long endurance aircraft;
cooling, after using ground-based air to cool the heat-storage material of the heat exchanger, the turboprop-powered medium altitude long endurance aircraft with recirculated air passed via the heat exchanger;
cooling, with ram air input into the heat exchanger from the air inlet, the heat-storage material of the heat exchanger after using the recirculated air passed via the heat exchanger to cool the turboprop-powered medium altitude long endurance aircraft;
cooling, after using the ram air to cool the heat-storage material of the heat exchanger, the turboprop-powered medium altitude long endurance aircraft with recirculated air passed via the heat exchanger.

18. A method according to claim 11, comprising:
in a first stage, while stationary on the ground, cooling, with ground-based cooling air input into the heat exchanger from the air inlet, the heat-storage material of the heat exchanger prior to using the recirculated air passed via the heat exchanger to cool the turboprop-powered medium altitude long endurance aircraft;
in a second stage following disconnection from the ground-based cooling, cooling, after using ground-based air to cool the heat-storage material of the heat exchanger, the turboprop-powered medium altitude long endurance aircraft with recirculated air passed via the heat exchanger;
in a third stage while flying in ambient air, cooling, with ram air input into the heat exchanger from the air inlet, the heat-storage material of the heat exchanger after using the recirculated air passed via the heat exchanger to cool the turboprop-powered medium altitude long endurance aircraft;
after landing, cooling, after using the ram air to cool the heat-storage material of the heat exchanger, the turboprop-powered medium altitude long endurance aircraft with recirculated air passed via the heat exchanger.

19. A method according to claim 11, wherein said turboprop-powered medium altitude long endurance aircraft does not include active air conditioning.

20. A system for thermally managing a turboprop-powered medium altitude long endurance aircraft, the system comprising:
a heat exchanger;
a heat-storage material;
an air inlet;
an air flow channel;
an air recirculation path;
external air from ground-based cooling air and a ram air scoop;
wherein the air flow channel is interlaced with the heat-storage material;
wherein the air inlet is arranged to input the external air into the heat exchanger so as to cool the heat-storage material within the heat exchanger;
wherein the heat exchanger is configured to cool recirculating air around the air recirculation path;
wherein the air recirculation path is arranged to allow the recirculating air to provide aircraft cooling air; and
a thermal control system configured to
provide cooling of the heat-storage material in the heat exchanger using the external air from the air inlet into the air flow channel; and
after the cooling of the heat-storage material, provide cooling, with the recirculated air cooled via the air flow channel, the turboprop-powered medium altitude long endurance aircraft.

* * * * *